3,252,765
APPARATUS FOR CARRYING OUT TREATMENT OF SOLIDS IN THE GRANULAR STATE BY LIQUIDS

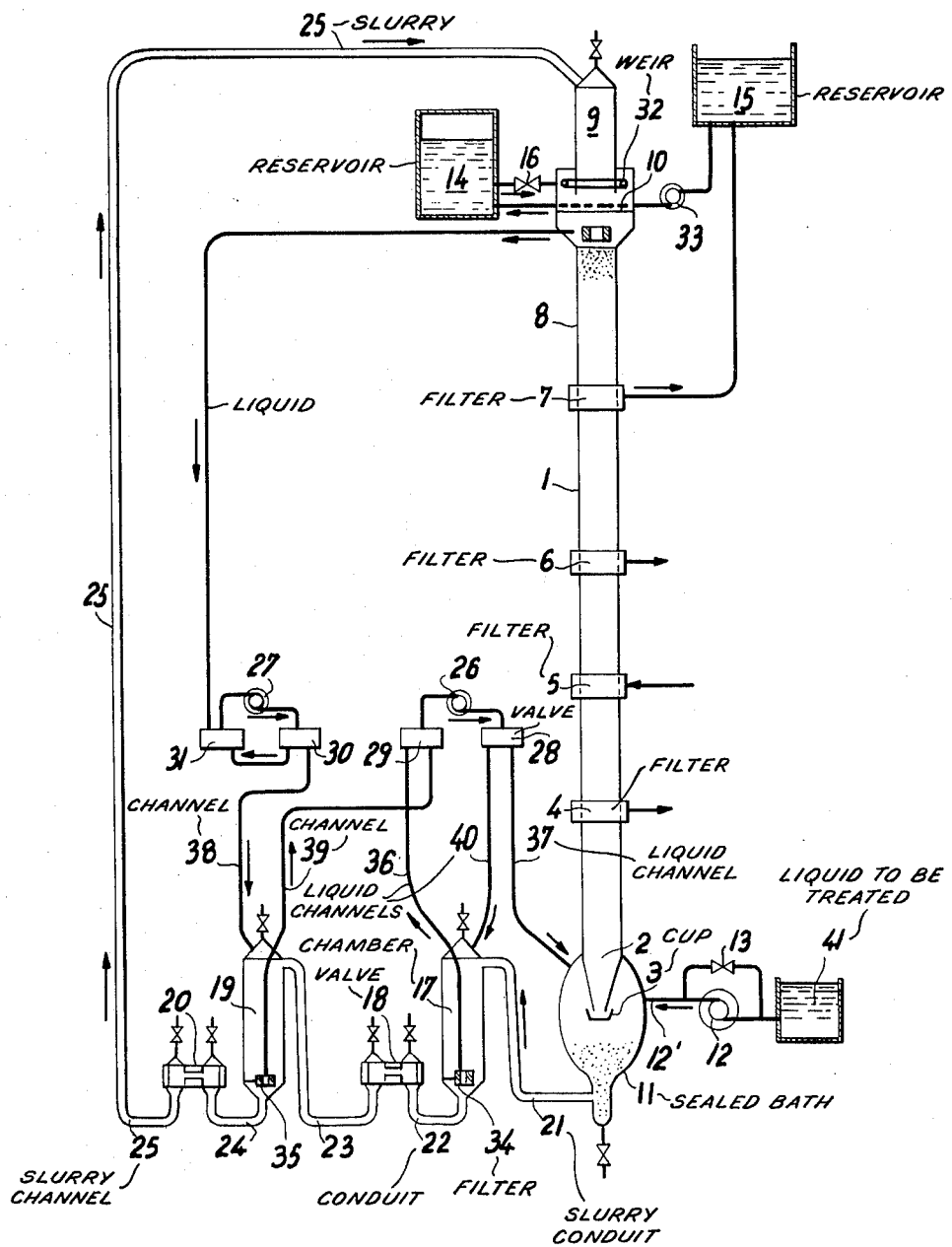

Georges Cohen de Lara and Michel Delachanal, Grenoble, Jacques Hure, Fontenay-aux-Roses, and Roger Platzer, Chatillon-sous-Bagneux, France, assignors to Commissariat à l'Energie Atomique, Paris, France
Original application Apr. 25, 1960, Ser. No. 24,524, now Patent No. 3,137,651, dated June 16, 1964. Divided and this application Dec. 2, 1963, Ser. No. 327,319
Claims priority, application France, Apr. 30, 1959, 793,667
9 Claims. (Cl. 23—270)

The present invention relates to an apparatus for carrying out treatment of solids in the granular state by liquids. This application is a division of the copending application, Ser. No. 24,524 (now U.S. Patent No. 3,137,651), filed April 25, 1960, by G. Cohen de Lara, M. Delachanal, J. Hure, R. Platzer and assigned to Commissariatà l'Energie Atomique.

In known apparatus which use columns filled with solid, in which the liquid is introduced at a certain level from the bottom of the column, in order to leave at the top of it, there is generally the difficulty of not being able to pass the liquid with a sufficiently high speed; in fact, the upper limit of the output of the liquid is generally too low, because it must be lower than that at which it causes entrainment of the solid granules by the liquid.

In order to remedy this disadvantage apparatus has been proposed in which a supplementary portion for a solid mobile bed is maintaining at the top of the column, above the zone of counter-current treatment. However, these known apparatus still have disadvantages, particularly as regards means for extraction and recycling of the solid granules; these necessitate in fact the use of pumps for conveying a suspension of solid in the liquid, although the disadvantages of this are known; it is known particularly that on passing through pumps and valves some solids crumble, and that also the pumps wear extremely rapidly, without taking account of blockages which tend to be produced in such apparatus. This is the case particularly with the processes and apparatus described in U.S. specifications Nos. 2,813,781 and 2,815,322.

The second specification mentioned relates an apparatus in which a fixed bed, is periodically recycled to the bottom of the column; the liquid is passed through periodically and not simultaneously with the recycling of the solid; under these circumstances, the effective duration of contact of the liquid with the solid is relatively low, which can considerably reduce the hourly yield of the apparatus.

The present invention has the object of avoiding the disadvantages mentioned above.

The apparatus according to the invention allows the circulation of liquid to be effected with high speeds and to obtain high yields, both with respect to time and to the volume of the apparatus.

Another object of the invention is an improved apparatus, permitting the treatment of solids by liquids, extraction of the solids and their reintroduction into the operative cycle, in a very practical manner and with a considerable reliability.

Further objects and advantages of the invention will appear from the following description and drawing, which illustrate a preferred embodiment of the invention. The single figure shows an apparatus in sectional elevation.

Referring to FIG. 1, there is shown a column 1 for containing a bed of granular solid; its truncated conical inner part 2 is located at the interior of a sealed bath 11. The truncated part terminates into a retractable cupel 3; by means of a mechanism (not shown in the drawing), the cupel 3 can be put into the position where it is shown in the figure or can be displaced to the end 2 of the column for completely engaging the outlet of this truncated part. During replenishment of the column and during stand-still of the apparatus, the cupel 3 prevents the solid from completely filling the bath 11; in fact, a small quantity of granules in the cupel form a screen which obstructs the lower aperture of the truncated part 2, preventing the granules from continuing to discharge. This does not prevent the liquid from passing the screen of granules in the cupel for passing into the column. On the other hand, during the periods of descent (advance) of the solid bed, with a view to its ultimate extraction the cupel 3 is retracted in order to allow the solid to pass; this retraction is not necessary if the sense of discharge of the liquid is reversed during such periods. However, the dimensions of the bath 11 are sufficient for the cupel not to be blocked by the solid granules with which the bath is provided in its lower part. The cupel 3 is never in contact with the lower end 2 and the operations of locating and retracting the cupel cannot adversely effect the solid granules.

At 4, 5, 6 and 7 are shown diagrammatically annular parts provided inwardly with a filter material, communicating on the one hand with the interior of the column and, on the other hand, with the exterior channels for the inlet and outlet of the liquid; the number and disposition of these parts 4, 5, 6 and 7 varies according to the nature of the operation to be effected in the column.

Above the outlet for the liquid 7, the column is extended by a funnel 8 also intended to be filled with granular solid; the bed filling the funnel 8 prevents expansion of the bed in the column 1, during high outputs of liquid passing from the bottom of the column towards the outlet 7.

The part 8 of the column is surmounted by a first sealed receptacle 10, for always containing the liquid indirectly providing a reservoir 15 open to the atmosphere, this contains the liquid discharged from 7, namely, which has traversed the bed of solid in the column 1.

By the receptacle 10 is placed another sealed reservoir 14 connected with 15 by a channel in which is mounted the pump 33; this pump permits the introduction into the reservoir 14 of the desired quantity of liquid. The gaseous phase above the liquid in the reservoir 14 can be suitably compressed (by operation of the pump 13 or by an exterior pneumatic means not shown on the drawing), so that the liquid at 14 is under the necessary pressure for extraction at the bottom of the column 1 of a predetermined portion of the bed of granular solid. It is necessary in fact for the pressure of the liquid at 10 to permit, during the period of extraction, the descent of the bed contained in the column 1. Communication between the reservoirs 14 and 10 is established by a channel comprising the valve 16 and terminating in 10 in a liquid distribution weir.

The receptacle 10 is surmounted by a part 9 at which emerges the channel 25 by which is recycled, in the column, the suspension of granules of solid.

The bath 11 at the bottom of the column 1 is connected through the intermediary of the pump 12 to a receptacle 41 containing the liquid to be treated; regulation of the input of this liquid into 11 is effected by means of a by-pass valve 13.

The lower part of the sealed bath 11 is in communication by 21 with the top of the storage chamber 17, the lower part of which communicates with the top of the second storage chamber 19 through the intermediary channels 22 and 23 between which is interposed a valve 18. On the other hand, the upper part of the bath 11 communicates through the intermediary of the valve 28 with a pump 26. This pump 26 and valve 28 are connected at 40 to the top of the chamber 17. On the other hand, a conduit 36 plunging to the bottom of the chamber 17 and provided with a filter 34 is in communication with the pump 26 through the interposition of the valve 29. In a similar manner, the pump 27 and the valves 30 and 31 supply the chamber 19; this is in communication at its upper part with the receptacle and at its lower part with the conduit 25, from which it can be isolated by means of the valve 20.

During operation of the apparatus, the pump 12 continually supplies the liquid to be treated into the bath 11; the liquid rises in the column 1, passes through the bed of solid and leaves at 7 to be stored in 15, the valve 16 then being closed.

Periodically, the valve 16 is opened in order to allow a certain quantity of liquid to enter at 10, under the prevailing pressure by way of the distribution weir 32; this has the effect of lowering the bed of granular solid; a portion of the granules then falls to the bottom of the bath 11. The speed of descent of the solid bed can be regulated by control of the pressure in the reservoir 14; as this pressure is lower than, equal to or higher than that which prevails in the bath 11, the output of liquid in the column is respectively diminished, stopped or reversed.

The operation of the apparatus is rendered continuous by the extraction of the granules contained in the bath 11 and their transport into the chamber 17 through the conduit 21. In the apparatus shown in the drawing, extraction can take place simultaneously with re-introduction of an equivalent portion of granules through the channel 25 in the part 9, at the top of the column. These periodic operations are effected in two stages, while the column continues to operate with the liquid entering at 12 and leaving at 7.

The first stage of the extraction/re-introduction period comprises the passage of the suspension of solid at 11 into 17 through 21 and, simultaneously, the passage of the suspension at 19 into 9 through 24 and 25. During this stage, the pump 26 withdraws only liquid through the channel 36 from the filter 34 which terminates this channel at the bottom of the chamber 17; the liquid thus withdrawn is conveyed through the channel 37 into the sealed both 11; thus a large part of the initial liquid, in which the granules of solid are in suspension in 11, returns to the bottom of the column 1. At the same time, the pump 27 withdraws the liquid from the receptacle 10 by passing through the valve 31, and forces it through 38 to the chamber 19; in this chamber, the liquid already treated (entering at 10) re-contacts the solid granules which were located there in the preceding period; it entrains them in the form of a suspension through the channels 24 and 25, the valve 20 being opened. During the course of this first stage, the valve 18 is closed.

At the end of the first stage described above, it is sufficient to prolong slightly the operation of the pump 27 so that the liquid entrains the last fractions of granular solids through the valve 20 and the channels 24 and 25. In this manner, there is no risk of deposition of the solid or of blockages during the following stage, in the course of which 20, 24 and 25 do not operate.

The second stage of the operation consists in the transfer of the granules of solid from the bottom of the chamber 17 to the top of the chamber 17 through 22–23, the valve 18 being opened and the valve 20 being closed. This is effected by withdrawing only liquid, through channel 39 provided with the filter 35, by means of the pump 26 and simultaneously forcing this liquid to the interior of the chamber 17 through the conduit 40.

At the end of the second operative stage, it is suitable to operate the pump 26 for a further time in order to rinse the valve 18 and the conduits 22 and 23 which have contained the suspension of the solid granules; by so doing the granules are entrained by the liquid alone coming from 19 through the tubes 39 and 40, so that the chamber 17 does not receive solid during this operation.

Preferably, the successive openings and closing of the valves 16, 18, 20, 28, 29, 30 and 31, as well as the pumps 26, 27, are controlled by one or more programming clock mechanisms, not shown in the drawing; they are established so that in no case are the valves 18 and 20 both open simultaneously and so that the continued rotation of the pumps does not cause excess pressure to act on the closed valves. It may be remarked, in accordance with the above, that the pumps 26 and 27 solely convey liquid, while the suspensions of solid granules in the liquid are conveyed from 11 to 17, from 17 to 19 and from 19 to 9 solely by circulation under pressure or sub-pressure periodically created in the chambers 17 and 19 by means of the pumps through the intermediary of the liquid.

It may be mentioned that, owing to the arrangements described, the operations of extraction and re-introduction of the solid granules cannot disturb or prevent circulation of the liquid in the column 1. It is noted, in fact, that the system of extraction and re-introduction, which comprises the circuit from 21 to 9 via 25, is always distinct from the treating circuit formed by the pump 12, the bath 11, the column 1 and the reservoir 15. Also, these two circuits can be controlled by two independent clock mechanisms.

The apparatus described comprises only two storage chambers 17 and 19, but it is to be understood that a greater number of such chambers can be used. This can be the case, for example, when complete replacement of the initial liquid of the suspension by the treated liquid comes into question; also, one or more of these chambers can be utilized for regeneration of the granules of solid, for example, by treatment with a base or an acid where an ion exchanger is concerned.

The portion of granular solid periodically withdrawn from the bed with a view to treatment, such as by regeneration, is subsequently reintroduced into the other extremity of the bed and this reintroduction is likewise periodic and may or may not coincide with the removal. According to the preferred form of the invention, the extraction and reintroduction are carried out simultaneously during the same period, but the portion reintroduced is that which has been extracted in the course of one of the preceding periods. In this manner, between the discharge of the bed and its reintroduction the given portion has time to be submitted to suitable treatments.

One of the treatments of the granular solid is for example a regeneration by known means, as arises with an ion exchanger.

Another treatment, which is independent of or combined with the above consists in the replacement of the initial liquid in the suspension by another liquid. In fact, according to a preferred mode of operation as above described, the portion of the granular solid withdrawn from the bed, during the period of extraction, is constituted by a suspension of granules in the liquid which has not previously passed through the bed; in this case, before reintroduction of the solid granules into the bed, their liquid is separated at least partly, to be replaced by a corresponding quantity of liquid taken from the outlet of the bed, that is to say, the liquid which has already reacted with the solid.

The means for preventing expansion of the solid bed, at the top of the column, can be constituted by a valve, but are preferably formed by a supplementary funnel part of the column itself, intended to contain a certain height of the solid bed above the outlet of the liquid from the column. According to a variation, these means are constituted by a system arranged to create, in the upper funnel part of the column, an auxiliary circulation of the fluid directed from top to bottom; this system comprises for example a conduit leading from the outlet for the treated liquid and discharging at the upper extremity of the funnel; a pump branched off from this source then causes circulation of a portion of the liquid from top to bottom of the upper funnel of the column; also this circulation is regulated so that the force exerted on the bed of solid opposes its displacement toward the top of the assembly of the solid bed.

We claim:

1. An apparatus for the treatment of solids in the granular state by liquids, comprising in combination a sealed vertical column adapted to contain a bed of granular solid, a first liquid inlet provided with pump means and located adjacent the bottom of said column, a first liquid outlet located near the middle of said column, a second inlet located at the upper extremity of the column for admitting solids suspended in the liquid, a second outlet located at the lower extremity of the column for removing the suspension of solids, a bed of suspended solids located and maintained in the portion of the column above the first liquid outlet for preventing upward expansion of the bed of solids below the first liquid outlet, a first reservoir for the liquid located above the column and connected to the first liquid outlet, a second sealed liquid reservoir connected with the first reservoir and adapted to withstand pressures greater than atmospheric, pump means in said connection for transferring liquid from said first to said second liquid reservoir, a third inlet means connecting said second reservoir with the top of said column, valve means in the connection between said second reservoir and the top of the column, a first and second sealed storage chambers connected in series through a valve means, the first storage chamber being connected to the second outlet means for removing solids in suspension from the lower extremity of the column, the second storage tank being connected through a valve to the second inlet for introducing solids suspension into the top of the column, a filter means near the top of the column connected with a third outlet means for removing liquid from the top of the column, said third outlet connected in series through a valve and pump to the top of the second chamber, filter means near the bottom of the first and second chambers connected with fourth and fifth outlet means respectively for removing liquid from the bottom of the chambers, said fourth and fifth outlet means connected through a single valve to a pump and hence to a valve means connected to fourth and fifth inlet means communicating with the top of the first chamber and the bottom of the column respectively for admitting liquid thereto.

2. An apparatus as described in claim 1 in which means for preventing upward extension of the bed of solid in said column are constituted by a body of said granular solid extended on top of the bed to said first outlet for the liquid.

3. An apparatus as described in claim 1, in which said first reservoir communicates with the atmosphere and with said first liquid outlet located near the middle of the column, the second sealed reservoir communicates with the top of the column through a sealed receptacle on top of and communicating with said column, the interior of said receptacle being directly connected to the inside of said column, and means including a valve connecting said second reservoir and said receptacle.

4. An apparatus as described in claim 1, each of said chambers being sealed, an inlet conduit for each of said chambers for the liquid, pump means in said inlet conduits, an inlet for the suspension of solid granular material in the liquid for each of said chambers, an outlet for the suspension for each chamber and filter means within each of said chambers above said suspension outlets and a conduit for each of said filters connecting each of said filters to said pumping means for removing the liquid from said chambers.

5. An apparatus as described in claim 4 including valves between each of said chambers and said pumping means for the liquid, said valves being constructed and arranged to establish successive and separate circulation of the liquid from said first chamber to the interior of said sealed bath and then from the interior of said second chamber to the interior of said first chamber.

6. An apparatus as described in claim 4 including a valve between said outlet in the lower part of said first chamber and said inlet in the upper part of said second chamber.

7. An apparatus as described in claim 4 including a valve between said outlet from said second chamber and a conduit discharging into said sealed receptacle, said last named valve connecting to said conduit.

8. An apparatus as described in claim 1 wherein the bottom of said column is a downwardly converging cone having an opening at its extremity communicating with a sealed bath surrounding the cone, a retractable cupel is mounted in said sealed bath, said cupel being positioned in confronting contact with the opening in the bottom extremity of the cone for controlling the flow of suspended solids from the column into the sealed bath, the first storage chamber communicates with the bottom of the column by means of a suspended solids outlet in the bottom of the sealed bath, the first liquid inlet communicates with the bottom of the column by means of an inlet in the side of the sealed bath, and the fifth inlet means communicates with the bottom of the column by means of an inlet near the top of the sealed bath.

9. An apparatus as described in claim 8, including a retractable cupel mounted in said sealed bath, said part terminating within said cupel.

References Cited by the Examiner
UNITED STATES PATENTS

| 2,813,781 | 11/1957 | Mertes | 23—310 |
| 3,109,870 | 11/1963 | Kuhn | 23—270.5 X |

FOREIGN PATENTS

| 1,550 | 1/1909 | Great Britain. |
| 405,186 | 2/1943 | Italy. |

NORMAN YUDKOFF, *Primary Examiner.*

S. EMERY, *Assistant Examiner.*